US009682668B2

(12) United States Patent
Bauer et al.

(10) Patent No.: US 9,682,668 B2
(45) Date of Patent: Jun. 20, 2017

(54) SYSTEM AND A METHOD FOR DETERMINING A CABIN LAYOUT IN A CABIN OF A VEHICLE AND TO AN AIRCRAFT

(71) Applicant: Airbus Operations GmbH, Hamburg (DE)

(72) Inventors: Hans-Achim Bauer, Hamburg (DE); Andre Zybala, Hanstedt (DE); Christian Rathge, Irxleben (DE); Christian Koker, Mahlwinkel (DE); Gunnar Jonas, Rostock (DE)

(73) Assignee: Airbus Operations GmbH (DE)

( * ) Notice: Subject to any disclaimer, the term of this patent is extended or adjusted under 35 U.S.C. 154(b) by 682 days.

(21) Appl. No.: 14/091,688

(22) Filed: Nov. 27, 2013

(65) Prior Publication Data

US 2014/0152088 A1    Jun. 5, 2014

Related U.S. Application Data

(60) Provisional application No. 61/731,498, filed on Nov. 30, 2012.

(30) Foreign Application Priority Data

Nov. 30, 2012 (EP) .................................. 12 195 059

(51) Int. Cl.
*B60R 16/03* (2006.01)
*B64D 11/06* (2006.01)
(Continued)

(52) U.S. Cl.
CPC .............. *B60R 16/03* (2013.01); *B64D 11/06* (2013.01); *B64D 11/0602* (2014.12);
(Continued)

(58) Field of Classification Search
None
See application file for complete search history.

(56) References Cited

U.S. PATENT DOCUMENTS

| 6,400,259 B1 * | 6/2002 | Bourcart ................ B60N 2/002 340/425.5 |
| 2010/0264727 A1 * | 10/2010 | Riedel ...................... H02J 1/00 307/9.1 |

(Continued)

FOREIGN PATENT DOCUMENTS

| GB | 2 327 914 A | 2/1999 |
| WO | 2011 073 063 A1 | 6/2011 |
| WO | 2012 085 097 A2 | 6/2012 |

*Primary Examiner* — Jared Fureman
*Assistant Examiner* — James Evans
(74) *Attorney, Agent, or Firm* — Lerner, David, Littenberg, Krumholz & Mentlik, LLP

(57) ABSTRACT

A system for determining a cabin layout in a cabin of a vehicle, includes a system for contactless transfer of power with primary magnetic elements and secondary magnetic elements that each overlap with at least one primary magnetic element. Based on sequentially providing power to primary magnetic elements and measuring at least one electric value in the powered primary magnetic element overlapping states of secondary magnetic elements and primary magnetic elements can be determined. By determining overlapping states for all primary magnetic elements in the cabin the number and positions of all secondary magnetic elements and all vehicle components attached thereto can be collected. The system avoids powering two contiguous primary magnetic elements to prevent a wrong determination of an overlapping state.

11 Claims, 3 Drawing Sheets

(51) Int. Cl.
*H02J 50/00* (2016.01)
*G01D 5/20* (2006.01)
(52) U.S. Cl.
CPC ............ *G01D 5/2073* (2013.01); *H02J 50/00* (2016.02); *Y02T 50/46* (2013.01)

(56) References Cited

U.S. PATENT DOCUMENTS

2011/0241435 A1* 10/2011 Saito .................. H02J 5/005
  307/104
2013/0176019 A1  7/2013 Bauer et al.

\* cited by examiner

SYSTEM AND A METHOD FOR DETERMINING A CABIN LAYOUT IN A CABIN OF A VEHICLE AND TO AN AIRCRAFT

CROSS-REFERENCE TO RELATED APPLICATIONS

This application claims the benefit of the filing date of U.S. Provisional Patent Application No. 61/731,498, filed Nov. 30, 2012, the disclosure of which is hereby incorporated herein by reference.

TECHNICAL FIELD

The invention relates to a system and a method for determining a cabin layout in a cabin of a vehicle and to an aircraft.

BACKGROUND OF THE INVENTION

Modern transport vehicles, such as commercial aircraft, usually comprise a passenger cabin that provides a distinct flexibility in arranging various components. For example, passenger seat rows, monuments and partition walls may be fastened to seat rails that essentially extend along the whole length of a passenger cabin floor and thereby provide a certain fastening grid. Also, electric and electronic overhead devices may be distributed inside the cabin, for example at the underside of overhead storage compartments, for providing passenger-related functions such as reading lights, information and warning signs, flight attendant call buttons, etc.

It is known to provide electrical power and data communication to various installed components by means of a contactless power and data transfer system. These are based on an electromagnetic transfer of electric power from primary magnetic elements to secondary magnetic elements, wherein the primary magnetic elements may be fixed to a floor or to the underside of overhead storage compartments and wherein the secondary magnetic elements are connected to the installed components.

WO 2012 085 097 A2 discloses a system and a method for contactless transfer of power and data within a cabin of a vehicle and especially an aircraft cabin.

WO 2011 073 063 A1 discloses a system for determining a position of a vehicle component relative to another vehicle component.

For improving the functionality of various passenger-related functions in a modern passenger cabin of a vehicle, it is paramount to provide positional and functional information about installed components which is further referred to as cabin layout information. Based on the high flexibility of a modern passenger cabin, a physical reconfiguration of a cabin layout leads to the necessity of manually re-adjusting the cabin layout information stored in a cabin management system. Presently, no system or method exists that may support this cabin layout information adjustment for reducing the effort in fully using the flexibility of the passenger cabin.

BRIEF SUMMARY OF THE INVENTION

An aspect of the invention provides a system for determining a cabin layout in a cabin of a vehicle as well as a method for determining a cabin layout in a cabin of a vehicle.

A system for determining a cabin layout in a cabin of a vehicle, comprises at least one first vehicle component, at least one row of primary magnetic elements attached to the at least one first vehicle component, at least one second vehicle component having a secondary magnetic element, the at least one second vehicle component being positionable relative to the at least one first vehicle component such that the secondary magnetic element overlaps with at least one primary magnetic element; at least one primary power control unit connected to at least one primary magnetic element of the at least one row of primary magnetic elements and adapted for providing electric power to the connected at least one primary magnetic element upon receiving a scan request signal; at least one measuring unit adapted for measuring at least one electric value in a primary magnetic element; and a control unit coupled with the at least one primary power control unit and with the at least one measuring unit. The control unit is adapted for sequentially sending a scan request signal to the at least one primary power control unit, such that the at least one primary power control unit provides power to the at least one connected primary magnetic element in a way that two contiguous primary magnetic elements of the at least one row of primary magnetic elements are not provided with electric power at the same time. The control unit is further adapted for receiving electric values of the powered primary magnetic elements measured by the measuring unit; for determining a position of the at least one secondary magnetic element based on an overlapping state between the at least one secondary magnetic element and the primary magnetic elements depending on the measured electric values; and for storing the position of each of the at least one secondary magnetic element.

As stated previously, a first component may be a component that has a fixed relationship to the structural composition of the cabin of the vehicle. For example, the first component may comprise or include a floor or a flooring element as well as a ceiling or a ceiling element, an overhead storage compartment or any other essentially fixed component. It goes without saying that the expression "at least one first component" may also include several different first components such as a floor and a ceiling as well as overhead storage compartments in a cabin.

The at least one row of primary magnetic elements describes an arrangement of a plurality of primary magnetic elements on or in a respective first component. The row may comprise a simple geometrical structure that may be associated with fastening means on the respective first component such as a seat rail, an attachment rail, an arrangement of boreholes for receiving screws or bolts, etc. In a simple design, the row of primary magnetic elements is a longitudinal arrangement of essentially adjacent primary magnetic elements that is parallel to a longitudinal extension of the vehicle cabin.

The at least one second vehicle component may for example be a seat row having 1 to 5 passenger seats, which seat row may be fastened to one or more longitudinal seat rails on or in the floor of the cabin. The second component may also include a passenger service unit fixable to a dedicated channel on the underside of overhead storage bins, wherein the positions of the passenger service units may be adapted to the positions of the associated seat rows on the floor underneath the overhead storage bins.

The primary magnetic elements should be distributed on the at least one first vehicle component such that in each possible position of a second vehicle component inside the cabin, an overlap may be created between at least one primary magnetic element and at least one secondary magnetic element.

The at least one primary power control unit may be connected to a power supply system of the respective vehicle and is primarily used to transfer electric power to the respective second vehicle components. This means that the primary power control unit is adapted for receiving power from a power supply system of the vehicle, generating an alternating current and providing this alternating current to a coil in the primary magnetic element. Thereby, an alternating current is induced into the secondary magnetic element that overlaps with the respective primary magnetic element and may afterwards be further processed to power equipment that is connected to the secondary magnetic element. Further, the primary power control unit may be adapted for receiving data and therefore may provide a data depending modulated alternating current signal that is superposed to the main alternating current such that this modulation signal may be demodulated into data after receiving it in the secondary magnetic element.

Depending on a magnetic coupling of a primary magnetic element and a secondary magnetic element, the electric characteristic of the primary magnetic element is influenced. By means of the at least one measuring unit, an electric value may be measured in the at least one primary magnetic element which is momentarily powered. For example, the current consumption in a primary magnetic element clearly decreases when a secondary magnetic element overlaps with the respective primary magnetic element. Further, the voltage level may be influenced as well, but this does not need to be the case, especially in a constant voltage environment. By measuring electric values such as current, voltage, a phase angle, etc., it may be clearly analyzed whether a primary magnetic element is overlapped by means of a secondary magnetic element and, if this is the case, an overlapping state, which resembles a overlapping percentage, fraction or ratio of overlapped area to the total area of a primary magnetic element, may further be determined. The measurement may be conducted by a measuring unit, which may be realised as a separate component or which may be integrated into another component that is electrically connected to a respective primary magnetic element. For example, the measuring unit may be integrated into the primary power control units.

After the necessary electric values of a powered primary magnetic element are measured by means of the respective measuring unit, the power provision to the particular primary magnetic element is interrupted. Afterwards, the next primary element may be investigated.

A primary power control unit, which may also be referred to as a "PIRM" (Primary inverted rectifier module) may therefore be adapted for receiving a scan request signal and for conducting a scanning process, which includes the determination of overlapping states of all primary magnetic elements connected thereto. The primary power control unit may furthermore be adapted for sending a response signal containing information about a determined overlapping state, which response signal may be received by the control unit or any other unit that is connected to the data communication interface, bus, network or other data communication means.

The control unit, which is coupled with the at least one primary power control unit and with the at least one measuring unit, is therefore adapted for sequentially determining overlapping states of primary magnetic elements. Based on this information the absolute position of secondary magnetic elements is precisely determinable. As stated further below, the control unit may be realised by different entities, such as strictly local control units that are connected to a small subset of primary power control units, or higher level control units that are adapted for controlling a plurality of local control units or are connected to primary magnetic elements themselves.

It has been recognized that if a secondary magnetic element overlaps with two essentially contiguous primary magnetic elements, a precise measuring of the electric values of the primary magnetic elements is hardly possible. The system according to the invention is therefore providing a sequential scan process in which the primary magnetic elements are powered up in a way that the powering of two contiguous primary magnetic elements is prevented. Therefore, in all possible cases, a precise determination of an overlap state in a primary magnetic element is achieved.

Depending on the actual design of the secondary magnetic elements, the primary magnetic elements and their distance to each other, it may be sufficient to provide two or three groups of primary magnetic elements for determining overlapping states of all primary elements.

The control unit may, after every primary magnetic element has been powered and after every overlapping state has been determined, store the gathered information. The control unit may additionally be adapted for calculating relative or absolute positions of the secondary magnetic elements inside the fixed cabin structure such that a complete layout of the cabin results. This may be based on known positions of all primary magnetic elements in the cabin and the relative positions of the secondary magnetic elements thereto. It goes without saying that the control unit may also just transfer the calculated or determined positions or overlapping states to a higher level control unit, an external calculating unit or a database unit in order to store the information.

In an advantageous embodiment, the primary magnetic elements of the at least one row of primary magnetic elements are arranged in an equidistant manner. By providing a distance between the primary magnetic elements, it is possible to reduce the necessary number of magnetic elements inside the cabin. Especially for use in an aircraft this clearly reduces the weight and the complexity of a power and data transfer system.

It goes without saying that the overall dimensions of the primary magnetic elements, the secondary magnetic elements and the distance between the primary magnetic elements should be adjusted to each other in order to be able to provide a power and data transfer between at least one primary magnetic element and each secondary magnetic element. Hence, a secondary magnetic element should have an extension that allows to bridge the distance between contiguous primary magnetic elements and the extension of one primary magnetic element.

In an advantageous embodiment each row comprises at least two groups of primary power control units, wherein the control unit is adapted for sequentially sending a scan request signal to the at least two groups such that two contiguous primary power control units connected to two contiguous sets of primary magnetic elements do not provide power to the respective primary magnetic elements connected thereto. Thereby, if each primary power control unit is connected to more than just one primary magnetic element, it may be avoided to power two contiguous primary magnetic elements.

In a preferred embodiment the at least two groups of primary power control units create an interlaced arrangement. In this regard, an interlaced arrangement is to be understood that primary power control units of both groups are provided in an alternating manner such that a primary power control unit of a first group is succeeded by a primary power control unit of a second group and so forth. This arrangement is repeated over the total number of primary power control units connected to the primary magnetic elements of one particular row. This has the consequence, that each row of primary magnetic elements the whole scan process is finished after two consecutive scanning steps, wherein each scanning step comprises providing electric power to the primary magnetic elements connected to the respective group of primary power control units, measuring the electric values and deactivating the provision of electric power.

In an advantageous embodiment, in each row of primary magnetic elements a set of primary magnetic elements are connected to the same primary power control unit. For example, a set of two, three, four or more primary magnetic elements may be connected to a single primary power control unit such that the number of components used in the vehicle cabin may be reduced to a large extent. It goes without saying that a scan process requested by the control unit is transmitted to a primary power control unit which then conducts the scanning task itself. Thereby, the primary magnetic elements may be provided with power sequentially such that two contiguous primary magnetic elements of each set of primary magnetic elements are not provided with power at the same time. In a simple manner, the set of primary magnetic elements may be provided with power, the electric values may be measured and the provision of power to the respective primary magnetic element one after another.

In a preferred embodiment, the set connected to the same primary power control unit has three primary magnetic elements. These three primary magnetic elements may be provided with power sequentially, which means that the first primary magnetic element is provided with power, after which electric values are measured and after which the provision of power is interrupted. Thereafter, the next primary magnetic element conducts the scan process and thereafter the third one. By this setup it is possible to integrate a measuring unit into or attached to the power control unit in order to reduce installation costs and the complexity of the overall system.

In a preferred embodiment, one row of primary magnetic elements comprises 5 to 15 primary power control units, each being connected to a set of primary magnetic elements. Thereby, also very large cabin layouts may be determined in a rather quick time.

In a further advantageous embodiment, the system comprises a plurality of contiguous rows of primary magnetic elements, wherein each row is associated with a contactless area control unit coupled with each primary power control unit connected to primary magnetic elements of the respective row, wherein a main control unit is connected to each contactless area control unit and wherein each contactless area control unit is adapted for sequentially sending scan request signals to the primary power control units associated with the respective row on receiving a scan request signal of the main control unit. Especially in larger passenger cabins dividing the total number of primary magnetic elements into smaller groups may simplify the installation effort as smaller areas in a cabin may be controlled separately or independently. By means of such a branching, a main control unit may communicate with several contactless area control units which in turn are adapted for directly controlling all associated primary power supply units connected to all primary magnetic elements. Direct connections between all primary magnetic elements in the cabin and a main control unit are therefore not necessary.

In an advantageous embodiment, at least two rows of primary magnetic elements are arranged in a contiguous manner and wherein the main control unit is adapted for sending a scan request signal to at least one first contactless area control unit and at least one second contactless area control unit sequentially such that no contiguous contactless area control units receive a scan request signal at the same time. The number of primary magnetic elements coupled with a contactless area control unit is not necessarily determined by structural requirements in the cabin but to practical reasons regarding the division of the total number of primary magnetic elements into smaller sets of primary magnetic elements. Therefore, it may possible to provide a cabin section that comprises independent sets of a plurality of contiguous rows of primary magnetic elements, e.g. on the cabin floor, coupled with a plurality of contactless area control units and arranged parallel to each other. A second vehicle component, which is movable relative to the cabin floor, may thereby overlap two contiguous primary magnetic elements of two contiguous rows of primary magnetic elements. As stated above, providing power to two contiguous primary magnetic elements that overlap with the same secondary magnetic element may lead to a faulty determination of an overlapping state and thereby needs to be prevented. By sequentially sending a scan signal to first contactless area control units and second contactless area control units, it is impossible to provide electric power to two contiguous primary magnetic elements of two contiguous rows. It goes without saying that the scan process within respective rows is conducted as described above. Thereby, the precision and accuracy of determining the cabin layout is clearly improved.

In a still further advantageous embodiment, the main control unit is adapted for sending a scan signal to the second contactless area control units a certain time delay after sending the scan signal to the first contactless area control units. This time delay may be dimensioned such that all primary power control units connected to a single contactless area control unit have conducted their scan process, including a feasible safety factor.

In a still further advantageous embodiment, the at least one first contactless area control unit and the at least one second contactless area control unit create an interlaced arrangement. Hence, rows associated with a first contactless area control unit are followed by rows associated with a second contactless area control unit and so forth.

In larger cabins there may be a plurality of parallelly arranged rows of primary magnetic elements. In case the distance between these parallelly arranged rows is clearly larger than the distance between the primary magnetic elements in each row, both parallelly arranged rows may conduct their scan process independently without having to consider any special timely order.

It is to be understood that during the determination of the cabin layout the second vehicle components or the electric devices attached thereto may be detected. This may be realised by sending a request over a data connection between a primary power control unit and a secondary power module of an overlapping pair of primary magnetic element and secondary magnetic element. Thereby, substantial changes in a cabin layout may be determined that exceed a mere change of a position.

After conducting the determination of the cabin layout the system according to the invention may act as a supply system for power and optionally for data as well. Based on the determined positions of the secondary magnetic elements in relation to the primary magnetic elements the links between the primary and secondary magnetic elements are chosen, wherein always the nearest primary magnetic element and/or the primary magnetic element that has the highest overlapping state with a respective secondary magnetic element is preferred over contiguous primary magnetic elements.

The system according to an embodiment of the invention therefore also constitutes a system for contactless data and power transmission between a first vehicle component and a second vehicle component. A respective primary power control unit delivers an alternating voltage into a targeted primary magnetic element, with the frequency of said alternating voltage optionally being modulated depending on data that is input at a respective data input port of the primary power control unit. As a result, a voltage is induced into the overlapping second magnetic element. A contactless secondary power module connected to the second magnetic element may be adapted to demodulate the data from the induced voltage and to provide it at a data output port. Furthermore, the contactless secondary power module is adapted to provide a voltage at a voltage output port, which voltage may be prepared for further use in an electric device at the second vehicle component.

Furthermore, the determination of the cabin layout may be conducted automatically after its modification or it may be conducted based on a request, e.g. through a flight attendant panel.

A method according to an aspect of the invention comprises the steps of sequentially providing electric power to at least one primary magnetic element of at least one row of primary magnetic elements attached to at least one first vehicle component; measuring electric values of the at least one powered primary magnetic element by means of a measuring unit; determining an overlapping state of at least one secondary magnetic element and the at least one powered primary magnetic element based on the measured electric values; interrupting the power provision to the at least one powered primary magnetic element; determining a position of at least one secondary magnetic element based on the determined overlapping states; and storing the position of each of the at least one secondary magnetic element; wherein the step of sequentially providing electric power to the at least one primary magnetic elements is conducted in a manner that contiguous primary magnetic elements are not provided with electric power at the same time.

Thereby, a comprehensive and advantageous method for determining a position of secondary magnetic elements in relation to primary magnetic elements is conducted such that a cabin layout can be determined after conducting the method steps for each present primary magnetic element.

The invention further relates to an aircraft having at least one cabin and at least one system according to the previously described features. The system supports the flexibility in the cabin layout in that it may easily detect a cabin layout modification. This allows an exact control of a power and data transfer from primary magnetic elements into secondary magnetic elements, such that the function of e.g. passenger related functions in seats located on the cabin floor and PSUs located in or on overhead stowage bins can be guaranteed.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, irrespective of their composition in the individual claims or their interrelationships. Furthermore, identical or similar components in the figures have the same reference characters.

DETAILED DESCRIPTION

Figure 1:
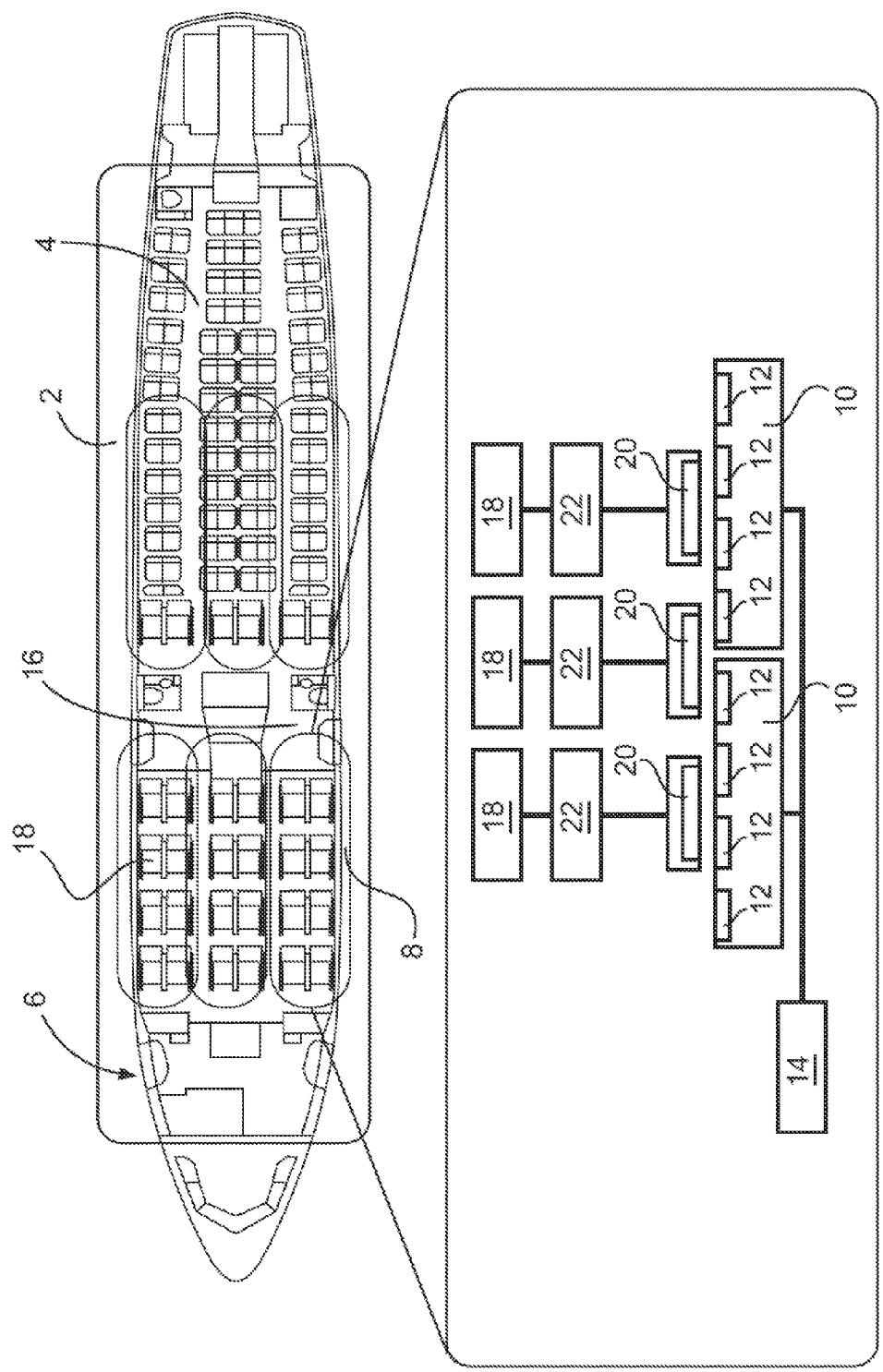
FIG. 1 shows a schematic overview of the system according to the invention.

FIG. 1 shows a schematic view of a contactless power supply system 2 in a cabin 4 of an aircraft 6, wherein the cabin is logically divided into several contactless power supply areas 8. A contactless power supply area 8 may comprise a plurality of contactless primary coil units 10 including a plurality of primary magnetic elements 12 as well as a contactless area control unit 14 connected to the contactless primary coil units 10. The primary magnetic elements 12 may be distributed along a first vehicle component 16, such as a cabin floor, in an equidistant manner.

Second vehicle components 18 may comprise secondary magnetic elements 20 that are movably positionable in the direct vicinity of the primary magnetic elements 12. By providing an overlap between a secondary magnetic element 20 and a primary magnetic element 12, electric power may be transferred from the primary magnetic element 12 to the secondary magnetic element 20 by means of induction. Through a contactless secondary power module 22, an electric load inside the second vehicle component 18 may be supplied with electrical power and optionally data, which may be transferred by means of a modulated alternating current signal between the primary magnetic element 12 and the secondary magnetic element 20.

An aspect of the invention provides the ability to detect the positions of all secondary magnetic elements 20 relative to all primary magnetic elements 12 in order to receive the information about the actual cabin layout as well as to provide the ability to transfer power from the nearest primary magnetic element 12 to a respective secondary magnetic element 20 throughout the cabin 4. In case the cabin layout shown in FIG. 1 is modified the system 2 is adapted to automatically detect the positions of all installed components in the cabin 4 automatically.

The relative position of a secondary magnetic element 20 to a primary magnetic element 12 may be determined by measuring at least one electric value of a primary magnetic element 12 in a powered state. This means that the respective primary magnetic element 12 is provided with electric power that leads to the generation of an electromagnetic field. The power may be based on an alternating voltage or a direct voltage, wherein the alternating voltage leads to a permanent induction into a coil arranged in the vicinity of the respective primary magnetic element, while a direct voltage merely leads to a short induction impulse.

In case a secondary magnetic element 20 at least partially overlaps the respective powered primary magnetic element 12, a voltage is induced into the secondary magnetic element 20. Due to this overlap, a certain electromagnetic coupling is present, depending on which a current or voltage curve on the primary magnetic element 12 can be measured. Based on the measurement of the current, the voltage and/or a phase angle between the voltage and the current, the coupling and therefore the overlapping state between a secondary magnetic element 20 and a primary magnetic element 12 can be determined. The overlapping state may give an impression about which fraction of the surface of the primary magnetic element 12 is overlapped by a secondary magnetic element 20. Therefore, from the overlapping state a clear determination of the relative position of the secondary magnetic element 20 to the powered primary magnetic element 12 is possible.

As apparent from FIG. 1, it may be possible that one secondary magnetic element 20 may overlap with more than just one primary magnetic element 12. Therefore, on two contiguous primary magnetic elements 12, a certain overlapping state different than zero may be measured. If all primary magnetic elements 12 are to be powered at once and the resulting current and voltage curves are measured at the same time, interference effects of two adjacent primary magnetic elements 12 that overlap with the same secondary magnetic element 20 will occur that lead to wrong measurement results. It may therefore be advantageous to avoid that two contiguous primary magnetic elements 12 are powered at the same time.

Figure 2:
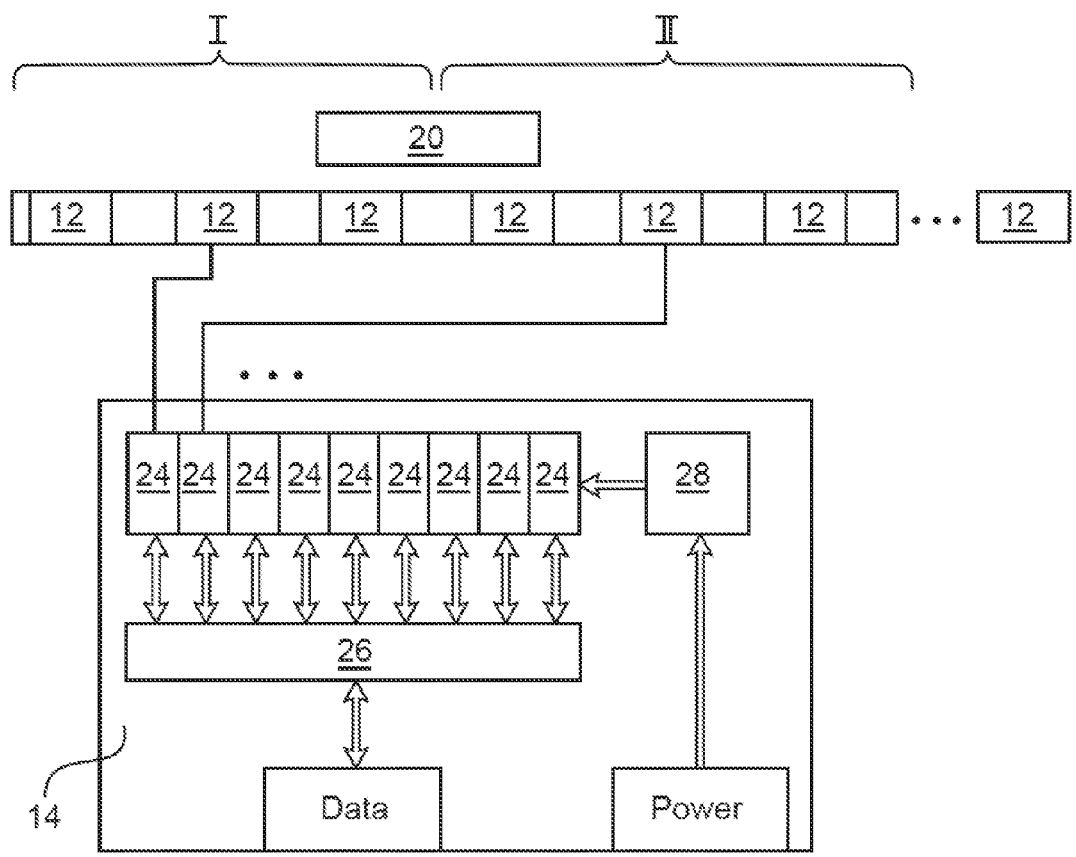
FIG. 2 shows a schematic, block-oriented view of a single row of primary magnetic elements and the components attached thereto.

As shown in FIG. 2, several primary magnetic elements 12 may be combined to a group of primary magnetic elements, which may be connected to one power supply unit 24 each.

A contactless area control unit 14 may further be connected to a set of primary power control units 24, each connectable to one set of primary magnetic elements 12. FIG. 2 shows exemplarily only a first set I and a second set II, each including three primary magnetic elements 12. The primary power control unit 24 is adapted to individually power each one of the connected set of primary magnetic elements 12.

It is preferred that each primary power control unit 24 also comprises a measuring device that is capable of measuring electric values such as voltage, current or other characteristics directed for example to a phase angle between voltage and current and the such. Hence, each primary power control unit 24 is capable of providing electric power to an individual primary magnetic element 12, conduct a measurement of electric values and thereafter interrupt the provision of electric power again.

A contactless area control unit 14 may further comprise a contactless data control module 26 which is capable of controlling each primary power control unit 24 in practically every possible function that may be accomplished. The contactless data control module 26 may therefore constitute a "master" for each primary power control unit 24. For example, if a contactless area control unit 14 receives a scan request signal by a main control unit (not shown), it may be transferred to the contactless data control module 26 which, in turn, may be capable of sequentially sending scan request signals to the individual primary power control units 24. This may include a sequential scanning process of at least two groups of primary power control units 24 that may be arranged in an interlaced manner.

If a contactless area control unit 14 receives a scan request signal, it may send scan request signals to the primary power control units 24 sequentially. The primary power control unit 24 receiving the scan request signal may individually conduct a scan process with all connected primary magnetic elements 12 sequentially for gathering information about an overlapping state between the respective primary magnetic element 12 and a secondary magnetic element 28. For example, all primary magnetic elements 12 of the connected set are sequentially powered, the electric values are measured and the provision of power is interrupted, one after another. Thereby, the primary power control units 24 may provide individual fractions of information about overlapping states in the cabin of the aircraft 6. Based on all fractions of information the contactless area control unit 14 or any other superordinate control unit may assemble information about the complete cabin layout.

It is apparent from the drawing in FIG. 2 that a secondary magnetic element 20 may have an extension that exceeds the width of a primary magnetic element 12 as well as the distance between individual primary magnetic elements 12. Therefore, it is always possible to have a complete overlap between a secondary magnetic element 20 and one primary magnetic element 12. It is also apparent that such a secondary magnetic element 20 may additionally partially overlap with another primary magnetic element 12. It may be advantageous to provide a scanning process described above in which two contiguous primary magnetic elements are not provided with power at the same time as measuring electric values may lead to an unforeseeable behaviour.

For providing power during normal operation, a primary power control module 28 is present that delivers power to the individual primary power control units 24, while data may be modulated through the primary power control units 24, while e.g. the contactless data control module may provide data to be modulated to the primary power control units 24. Depending on the detected primary magnetic element 12 that fully overlaps with the secondary magnetic element 20, the particular primary magnetic element 12 is provided with power and a data modulated signal while primary power control units 24 that are not connected to an overlapped primary magnetic element 12 are not provided with electric power.

Figure 3:
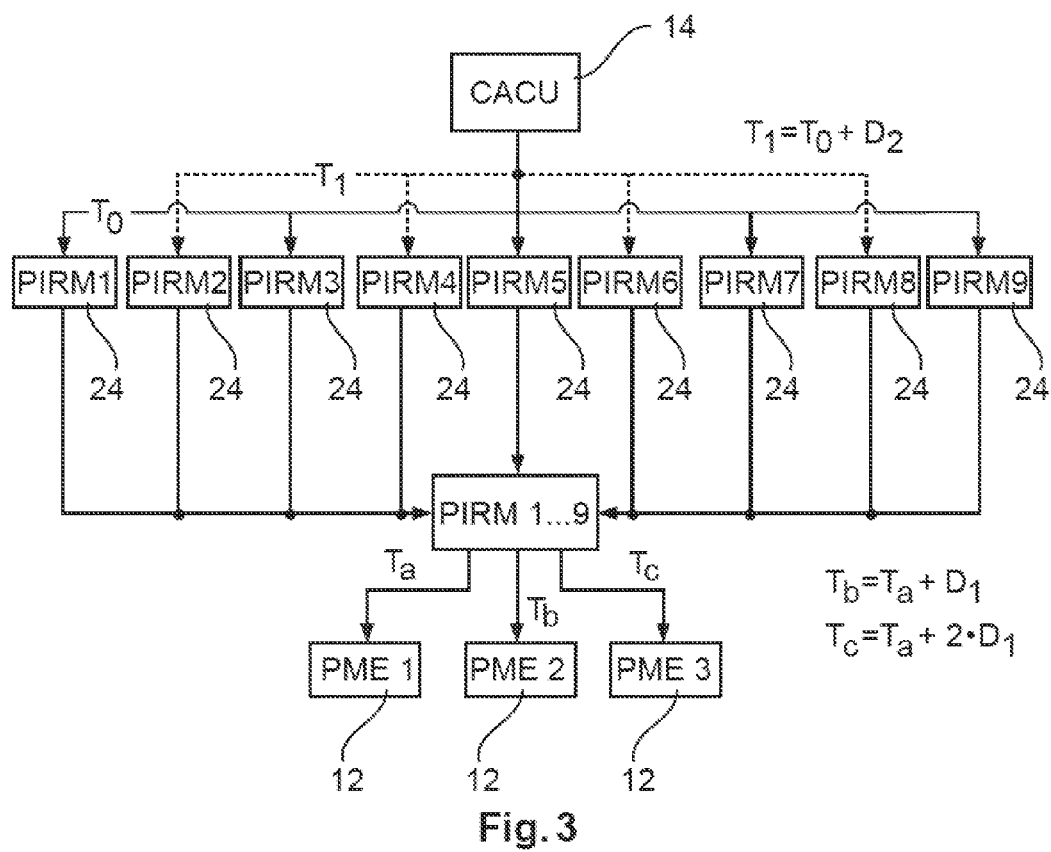
FIG. 3 shows another schematic, block-oriented view on the control architecture for a single row of primary magnetic elements.

FIG. 3 shows the timely order of the scan process in a schematic drawing. From a contactless area control unit 14, which is connected to a plurality of primary power control units 24 (distinguishable by the expressions PIRM1 to PIRM9), each one of the first, third, fifth, seventh and ninth primary power control units 24 receives a scan signal at a time $T_0$, while the second, fourth, sixth, eighth primary power control units 24 receive a scan signal at a time $T_1$. The time $T_1$ is reached after $T_0+D_2$, while $D_2$ is a predetermined time delay. The delay $D_2$ between these two request cycles is minimizable by awaiting every response with a certain timeout. This means that every response of a currently running request cycle will be considered as having been received by the contactless area control unit 14 during a certain amount of time in order to allow the initiation of a next request cycle. If a response gets lost, the next request cycle will be started after the defined timeout.

After receiving a scan request by a primary power control unit 24, all connected primary magnetic elements 12 are provided with power sequentially in order for conducting the measuring of electric values. Here, another predetermined time delay $D_1$ is used for a timely separation of the individual scan steps. Hence, the scan process for the first primary magnetic element 12 is conducted starting at time $T_a$, a scan process for the second primary magnetic element 12 is conducted starting at time $T_b$ and the scan process for the third primary magnetic element 12 is conducted starting at time $T_c$.

Figure 4:
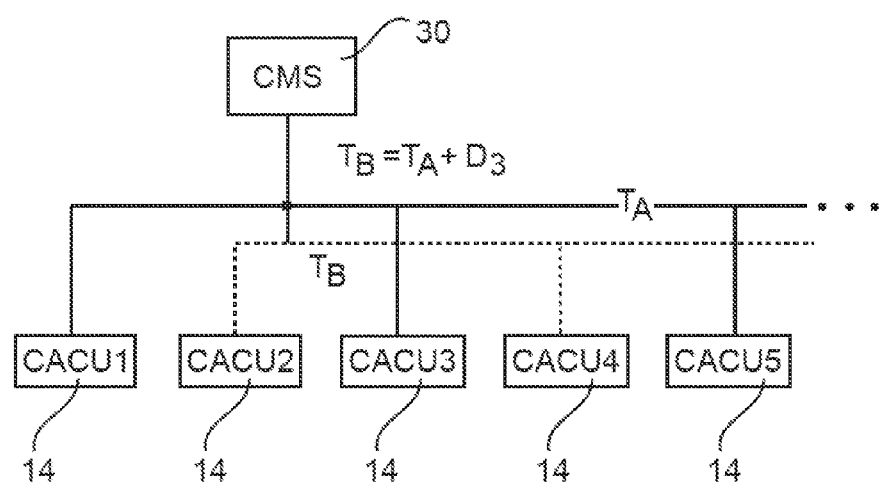
FIG. 4 shows a schematic, block-oriented view on the control architecture for a plurality of rows of primary magnetic elements.

As shown in FIG. 4, a cabin management system as a main control unit 30 sends scan requests to contactless area control units 14 sequentially such that a first group and a second group of contactless area control units 14 are conducting a scan process, again separated by a predetermined time delay $D_3$. Hence, exemplarily the contactless area control units 14 with uneven numbers (CACU1, CACU3, CACU5 and so on), receive a scan request signal at $T_A$, while the contactless area control units 14 with even numbers (CACU2, CACU4 and so on) receive a scan request signal at $T_B$, which is $T_A+D_3$.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A system for determining a cabin layout in a cabin of a vehicle, the system comprising:
   at least one first vehicle component;
   at least one row of primary magnetic elements attached to the at least one first vehicle component;
   at least one second vehicle component having a secondary magnetic element, the at least one second vehicle component being positionable relative to the at least one first vehicle component such that the secondary magnetic element overlaps with at least one primary magnetic element;
   at least one primary power control unit connected to at least one primary magnetic element of the at least one row of primary magnetic elements and adapted for providing electric power to the connected at least one primary magnetic element upon receiving a scan request signal;
   at least one measuring unit adapted for measuring at least one electric value in a primary magnetic element; and
   a control unit coupled with the at least one primary power control unit and with the at least one measuring unit;
   wherein the control unit is adapted
   for sequentially sending a scan request signal to the at least one primary power control unit, such that the at least one primary power control unit provides power to the at least one connected primary magnetic element, such that two contiguous primary magnetic elements of the at least one row of primary magnetic elements are not provided with electric power at the same time;
   for measuring electric values of the powered primary magnetic elements by the measuring unit;
   for determining a position of the at least one secondary magnetic element based on an overlapping state between the at least one secondary magnetic element and the primary magnetic elements depending on the measured electric values; and
   for storing the position of each of the at least one secondary magnetic element,
   wherein each row comprises at least first and second groups of primary power control units,
   wherein the control unit is adapted for sequentially sending a scan request signal to the at least first and second groups of primary power control units such that two contiguous primary power control units connected to two contiguous sets of primary magnetic elements do not provide power to the respective primary magnetic elements connected thereto,
   wherein the at least first and second groups of primary power control units create an interlaced arrangement, in which the primary power control units of both groups are provided in an alternating manner such that a primary power control unit of the first group is succeeded by a primary power control unit of the second group.

2. The system according to claim 1, wherein the primary magnetic elements of the at least one first row of primary magnetic elements are arranged in an equidistant manner.

3. The system according to claim 1, wherein in each row of primary magnetic elements a set of primary magnetic elements is connected to the same primary power control unit.

4. The system according to claim 3, wherein the set connected to the same primary power control unit has three primary magnetic elements.

5. The system according to claim 1, wherein one row of primary magnetic elements is associated with 5 to 15 primary power control units.

6. The system according to claim 1, comprising a plurality of contiguous rows of primary magnetic elements,
   wherein each row is associated with a contactless area control unit coupled with each primary power control unit connected to primary magnetic elements of the respective row,
   wherein a main control unit is connected to each contactless area control unit; and
   wherein each contactless area control unit is adapted for sequentially sending scan request signals to the primary power control units associated with the respective row on receiving a scan request signal of the main control unit.

7. The system according to claim 6, wherein at least two rows of primary magnetic elements are arranged in a contiguous manner and wherein the main control unit is adapted for sending a scan request signal to at least one first contactless area control unit and at least one second contactless area control unit sequentially, such that no contiguous contactless area control units receive the scan request signal at the same time.

8. The system according to claim 7, wherein the main control unit is adapted for sending a scan signal to the second contactless area control units a certain time delay after sending the scan request signal to the first contactless area control units.

9. The system according to claim 7, wherein the at least one first contactless area control unit and the at least one second contactless area control unit create an interlaced arrangement.

10. A method for determining a cabin layout in a cabin of a vehicle, comprising:
    sequentially providing electric power to at least one primary magnetic element of at least one row of primary magnetic elements attached to at least one first vehicle component;
    measuring electric values of the at least one powered primary magnetic element by means of a measuring unit;
    determining an overlapping state of at least one secondary magnetic element and the at least one powered primary magnetic element based on the measured electric values;
    interrupting the power provision to the at least one powered primary magnetic element;

determining a position of at least one secondary magnetic element based on the determined overlapping states; and storing the position of each of the at least one secondary magnetic element;

wherein the step of sequentially providing electric power to the at least one primary magnetic elements is conducted in a manner that contiguous primary magnetic elements are not provided with electric power at the same time, wherein each row comprises at least first and second groups of primary power control units, wherein a control unit sequentially sends a scan request signal to the at least first and second groups of primary power control units such that two contiguous primary power control units connected to two contiguous sets of primary magnetic elements do not provide power to the respective primary magnetic elements connected thereto, wherein the at least first and second groups of primary power control units create an interlaced arrangement, in which the primary power control units of both groups are provided in an alternating manner such that a primary power control unit of the first group is succeeded by a primary power control unit of the second group.

11. An aircraft, having at least one cabin and at least one system, the system comprising:
- at least one first vehicle component;
- at least one row of primary magnetic elements attached to the at least one first vehicle component;
- at least one second vehicle component having a secondary magnetic element, the at least one second vehicle component being positionable relative to the at least one first vehicle component such that the secondary magnetic element overlaps with at least one primary magnetic element;
- at least one primary power control unit connected to at least one primary magnetic element of the at least one row of primary magnetic elements and adapted for providing electric power to the connected at least one primary magnetic element upon receiving a scan request signal;
- at least one measuring unit adapted for measuring at least one electric value in a primary magnetic element; and
- a control unit coupled with the at least one primary power control unit and with the at least one measuring unit;

wherein the control unit is adapted for sequentially sending a scan request signal to the at least one primary power control unit, such that the at least one primary power control unit provides power to the at least one connected primary magnetic element, such that two contiguous primary magnetic elements of the at least one row of primary magnetic elements are not provided with electric power at the same time;

for measuring electric values of the powered primary magnetic elements by the measuring unit;

for determining a position of the at least one secondary magnetic element based on an overlapping state between the at least one secondary magnetic element and the primary magnetic elements depending on the measured electric values; and for storing the position of each of the at least one secondary magnetic element, wherein each row comprises at least first and second groups of primary power control units, wherein the control unit is adapted for sequentially sending a scan request signal to the at least first and second groups of primary power control units such that two contiguous primary power control units connected to two contiguous sets of primary magnetic elements do not provide power to the respective primary magnetic elements connected thereto, wherein the at least first and second groups of primary power control units create an interlaced arrangement, in which the primary power control units of both groups are provided in an alternating manner such that a primary power control unit of the first group is succeeded by a primary power control unit of the second group.

* * * * *